United States Patent
Baek et al.

(10) Patent No.: US 8,905,565 B2
(45) Date of Patent: Dec. 9, 2014

(54) DISPLAY DEVICE HAVING A SIMPLIFIED ASSEMBLY OF COMPONENTS

(71) Applicant: Samsung Display Co., Ltd., Yongin (KR)

(72) Inventors: In-Su Baek, Seoul (KR); Myoung-Seok Son, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 92 days.

(21) Appl. No.: 13/836,411

(22) Filed: Mar. 15, 2013

(65) Prior Publication Data

US 2014/0112019 A1    Apr. 24, 2014

(30) Foreign Application Priority Data

Oct. 18, 2012   (KR) ........................ 10-2012-0115706

(51) Int. Cl.
- *G09F 13/08* (2006.01)
- *G02F 1/1333* (2006.01)
- *G09F 9/30* (2006.01)
- *F21V 8/00* (2006.01)

(52) U.S. Cl.
CPC .............. *G02B 6/005* (2013.01); *G02F 1/1333* (2013.01); *G09F 9/30* (2013.01)
USPC ........................................ 362/97.1; 362/97.3

(58) Field of Classification Search
CPC .. G02B 6/0011; G02B 6/0021; G02B 6/0083; G02B 6/0086–6/0091; G02F 1/133602–1/33621
USPC .............. 362/97.1–97.4; 349/58–71
See application file for complete search history.

(56) References Cited

U.S. PATENT DOCUMENTS

| | | | | |
|---|---|---|---|---|
| 6,545,430 B2 * | 4/2003 | Ono et al. | ...................... | 315/291 |
| 7,612,841 B2 | 11/2009 | Kim et al. | | |
| 8,430,551 B2 * | 4/2013 | Kim et al. | ...................... | 362/621 |
| 8,562,200 B2 * | 10/2013 | Park | .............................. | 362/633 |
| 8,678,634 B2 * | 3/2014 | Isobe | ............................. | 362/608 |
| 8,780,296 B2 * | 7/2014 | Kim et al. | ......................... | 349/65 |
| 2003/0223215 A1 * | 12/2003 | Shin et al. | ........................ | 362/27 |
| 2005/0099556 A1 * | 5/2005 | Shimojoh | ........................ | 349/65 |
| 2008/0297687 A1 * | 12/2008 | Watanabe | ........................ | 349/58 |
| 2008/0304288 A1 * | 12/2008 | Iwasaki | .......................... | 362/632 |
| 2009/0058306 A1 * | 3/2009 | Itaya | ............................. | 362/632 |
| 2012/0002130 A1 | 1/2012 | Watanabe | | |

FOREIGN PATENT DOCUMENTS

| | | |
|---|---|---|
| KR | 10-1036430 | 7/2009 |
| KR | 10-2010-0034821 | 4/2010 |

* cited by examiner

*Primary Examiner* — Mariceli Santiago
(74) *Attorney, Agent, or Firm* — H.C. Park & Associates, PLC (57) ABSTRACT

A display device having a simplified assembly of components. The display device includes a display panel, a circuit board, a light guide plate disposed under the display panel to guide a light toward the display panel, a molding member disposed between the display panel and the light guide plate, and a covering member extending from a lower surface of the light guide plate to an upper surface of the display panel. The light guide plate has a supporting portion that protrudes from a side surface of the light guide plate to support the circuit board disposed adjacent to an edge of the display panel. The molding member supports the display panel. The covering member fixes the components of the display device. This way a display device is provided that does not need a bottom chassis, thereby the assembling of the display panel is simplified.

20 Claims, 11 Drawing Sheets

DISPLAY DEVICE HAVING A SIMPLIFIED ASSEMBLY OF COMPONENTS

This application claims priority from and the benefit of Korean Patent Application No. 10-2012-0115706, filed on Oct. 18, 2012, which is hereby incorporated by reference for all purposes as if fully set forth herein.

BACKGROUND OF THE INVENTION

1. Field of the Invention

Exemplary embodiments of the invention relate to a display device. More particularly, exemplary embodiments of the invention relate to a display device simplifying assembling of components.

2. Discussion of the Background

A liquid crystal display ("LCD") device is widely used in monitors, laptops computers, and mobile electronic devices because the LCD device has low power consumption, is thin and is light. The LCD device displays images as arrangements of liquid crystals which are changed according to an electric field which alters the transmissivity of light through the liquid crystals. The LCD device includes a display panel controlling the liquid crystals and a backlight assembly providing light to the display panel.

The LCD device further includes a light-emitting diodes ("LED") assembly generating the light, a light guide plate modifying optical distribution of the light generated from the LED assembly, a reflection sheet reflecting the light leaked from the light guide plate, and an optical sheet improving optical properties of the light emitted through the light guide plate. Furthermore, the backlight assembly may include a lamp assembly, a bottom chassis receiving the reflection sheet and the optical sheet, a receiving member integrated with the bottom chassis, and a panel guide member fixing the receiving member and the display panel.

The LCD device may include a top chassis, a mold frame, a middle chassis, and a fixing member of the light guide plate. The light guide plate is received in the bottom chassis by the fixing member. The mold frame is disposed on the light guide plate to guide edges of the light guide plate. The LCD device may have a layered structure in which the optical sheet and the display panel are disposed in a certain order.

However, the manufacturing processes of the LCD device may become complicated when the LCD device includes many components such as: the light guide plate, the fixing member, the receiving member, the mold frame, the middle chassis, the display panel, and the panel guide member. Furthermore, as the number of the processes to manufacture the LCD device increases, the manufacturing time and the cost of assembling the components of the LCD device also increase.

In particular, in a display device for a laptop computer, the bottom chassis has an engaging portion protruding outside the boundaries of the display device and the engaging portion is used for assembling of a body set and a printed board assembly. However, when an angle of the engaging portion is tilted, the bottom chassis is transformed entirely by a pressure of the body set, and the light guide plate supported by the bottom chassis contacts the display panel causing display stains which deteriorate display quality.

The above information disclosed in this Background section is only for enhancement of understanding of the background of the invention and therefore it may contain information that does not form any part of the prior art.

SUMMARY OF THE INVENTION

Exemplary embodiments of the invention provide a display device simplifying the assembling of components and avoiding a deterioration of display quality due to a transformation or bending of a bottom chassis.

Additional features of the invention will be set forth in the description which follows, and in part will be apparent from the description, or may be learned by practice of the invention.

An exemplary embodiment of the present invention discloses a display device including: a display panel displaying an image, a circuit board including a driving circuit mounted thereon, a light guide plate disposed under the display panel to guide a light toward the display panel, a molding member disposed between the display panel and the light guide plate, and a covering member extending from a lower surface of the light guide plate to an upper surface of the display panel. The circuit board is disposed adjacent to an edge of the display panel. The light guide plate has a supporting portion that protrudes from a side surface of the light guide plate to support the circuit board. The molding member supports the display panel. The covering member fixes the display panel, the circuit board, the light guide plate and the molding member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer or section from another region, layer or section. Thus, a first element, component, region, layer or section discussed below could be termed a second element, component, region, layer, or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Figure 1:
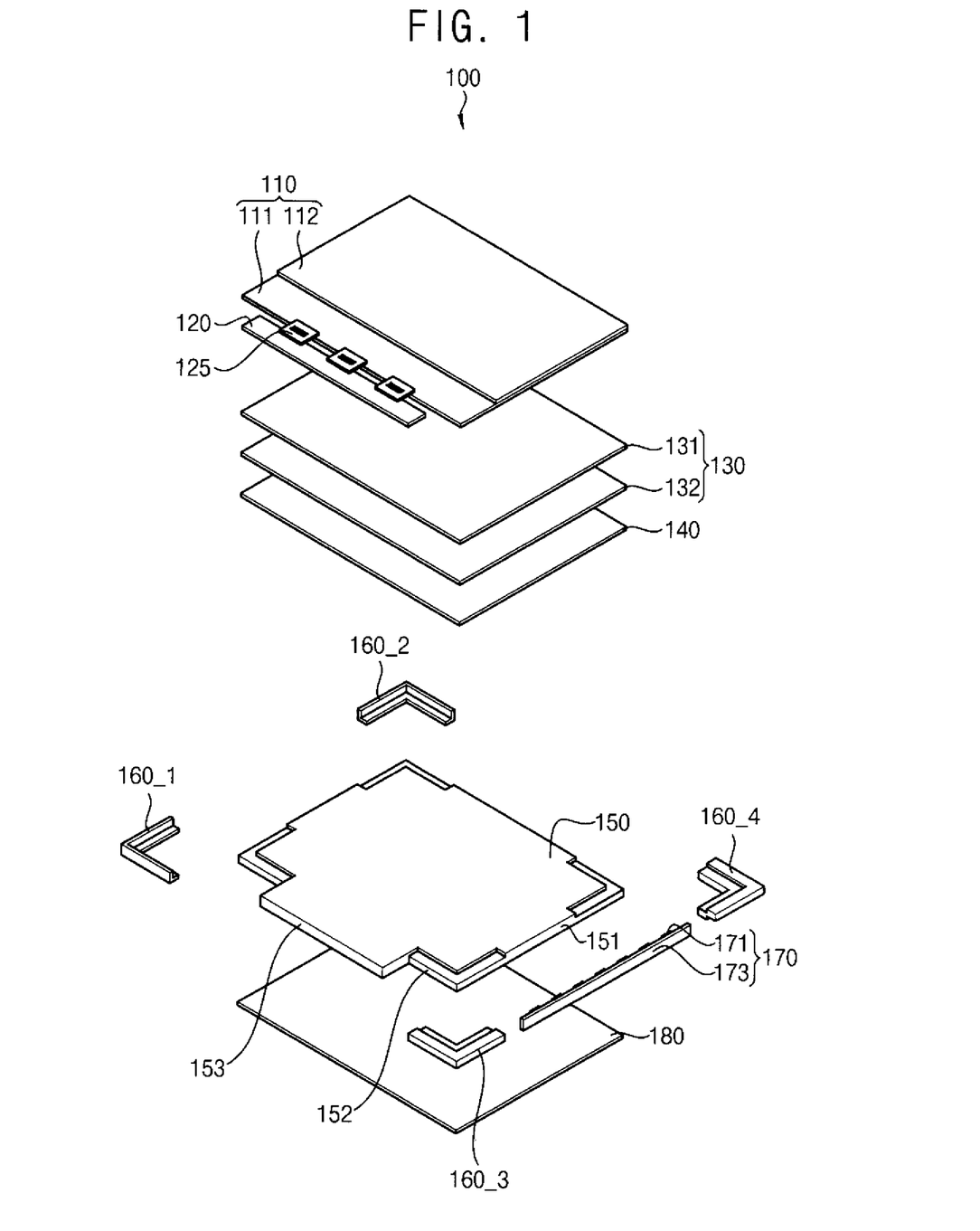
FIG. 1 is an exploded perspective view of a display device according to an exemplary embodiment of the present invention.

FIG. 1 is an exploded perspective view of a display device according to an exemplary embodiment of the invention.

Referring to FIG. 1, a display device 100 according to the present embodiment includes a display panel 110, a circuit board 120, a light guide plate 150, a molding member 160, and a covering member (not shown). Additionally, the display device 100 may further include optical sheets 130, a diffusion sheet 140, a light source module 170, and a reflection sheet 180.

The display panel 110 includes a lower substrate 111, an upper substrate 112 facing the lower substrate 111, and a liquid crystal layer disposed between the lower substrate 111 and the upper substrate 112. The display panel 110 is disposed on the light guide plate 150 and an image is displayed on the display panel 110 using a light from the light guide plate 150.

The lower substrate 111 includes a plurality of thin film transistors ("TFTs") (not shown) arranged in a matrix where the transistors function/work as switching elements. Each of the TFTs includes a gate electrode and a source electrode electrically connected to a gate line and a data line, respectively. The TFTs further include a drain electrode which is electrically connected to a pixel electrode formed of transparent conductive material.

The upper substrate 112 includes a common electrode formed of transparent conductive material. The upper substrate 112 may include a plurality of color filters formed on the upper substrate 112.

The circuit board 120 is disposed adjacent to an edge of the display panel 110. A driving circuit for driving the display panel 110 is mounted on the circuit board 120. The circuit board 120 and may include a printed board assembly ("PBA") or a printed circuit board ("PCB"). The circuit board 120 may be disposed substantially parallel with the display panel 110. The circuit board 120 may include a flexible circuit board.

The circuit board 120 may include a tape carrier package ("TCP") 125 electrically connecting the display panel 110 and the circuit board 120. The TCP 125 is formed of a film on which a driving chip is mounted. A plurality of data TCPs are attached to a side of the lower substrate 111 while a plurality of gate TCPs are attached to another side of the lower substrate 111. The data TCPs and the gate TCPs apply driving signals to drive the display panel 110 and gate timing signals to control a driving time, respectively.

The optical sheets 130 and the diffusion sheet 140 are disposed on the light guide plate 150. The optical sheets 130 and the diffusion sheet 140 improve optical properties of the light emitted from the light guide plate 150 and diffuse the light. For example, the optical sheets 130 may include at least one prism sheet concentrating the light from the light guide plate 150 to improve luminance uniformity and front-view luminance of the light.

The light guide plate 150 is disposed under the display panel 110. The light guide plate 150 guides the light generated from the light source module 170 adjacent to a side of the light guide plate 150 toward the display panel 110. The light guide plate 150 may include a light guide pattern or a reflection pattern to guide paths of the light. When the light emitted from a light incident surface 151 of the light guide plate 150 reaches an upper surface or a lower surface of the light guide plate 150 at an angle larger than a critical angle, the light is totally reflected within the light guide plate 150 and spreads out in the light guide plate 150. The light guide plate 150 may have a plate shape. The light guide plate 150 may include a transparent material such as polymethyl methacrylate ("PMMA") or polycarbonate ("PC").

The light guide plate 150 includes a supporting portion 153 that protrudes from a side surface 152 of the light guide plate 150 and supports the circuit board 120. The light guide plate 150 has a flat rectangular plate shape and includes one or more side surfaces 152 that partially or wholly protrude similar to the supporting portion 153, except for the light incident surface 151. The light guide plate 150 may be formed using a resin by an injection molding process. An upper surface of the supporting portion 153 on which the circuit board 120 is disposed may be substantially parallel and coplanar to an upper surface of the light guide plate 150 without any stepped portion because the display panel 110 and the circuit board 120 may be disposed to be substantially parallel and coplanar to each other. It should be understood that the supporting portion may not be limited thereto, and the supporting portion 153 may have various sizes or shapes and may include a step if the supporting portion is not coplanar to the upper surface of the light guide plate. Moreover, the supporting portion may be formed on a component of the display panel that is different from the light guide plate 150.

The molding member 160 is disposed between the display panel 110 and the light guide plate 150. The molding member 160 guides and supports edges of the light guide plate 150 and the display panel 110. The molding member 160 will be described in detail referring to FIGS. 2, 3, 4, 5, 6A and 6B.

The light source module 170 is disposed facing the light incident surface 151 of the light guide plate 150. The light source module 170 includes a light source board 173 on which a plurality of light sources 171 generating light are mounted. The light sources 171 may include light emitting diodes ("LEDs") generating the light by an external power supply. The distribution of the light generated by the LEDs may be similar to the distribution of light generated by a plurality of point light sources arranged in a line. The light sources 171 may include one or more LEDs emitting red light, LEDs emitting green light, LEDs emitting blue light, and LEDs emitting white light. For example, the light sources 171 may include one or more red LEDs, green LEDs, and blue LEDs, and white light mixed from the red, green, and blue light may be supplied to the light guide plate 150. The above-mentioned number and the arrangement of the light sources and the light source module are exemplary and they are not limited thereto.

The reflection sheet 180 is disposed under the light guide plate 150. The reflection sheet 180 reflects the light from the light guide plate 150 toward the upper surface of the light guide plate 150.

The covering member 190 (described with reference to FIG. 9A) extends toward both a lower surface of the light guide plate 150 and an upper surface of the display panel 110 to partially cover the light guide plate 150 and the display panel 110. The covering member 190 fixes the display panel 110, the circuit board 120, the light guide plate 150 and the molding member 160. When the reflection sheet 180 is disposed under the light guide plate 150, the covering member 190 extends toward both a lower surface of the reflection sheet 180 and the upper surface of the display panel 110 to partially cover the reflection sheet 180 and the display panel 110. The covering member 190 will be described in detail later with reference to FIG. 9A.

Figure 2:
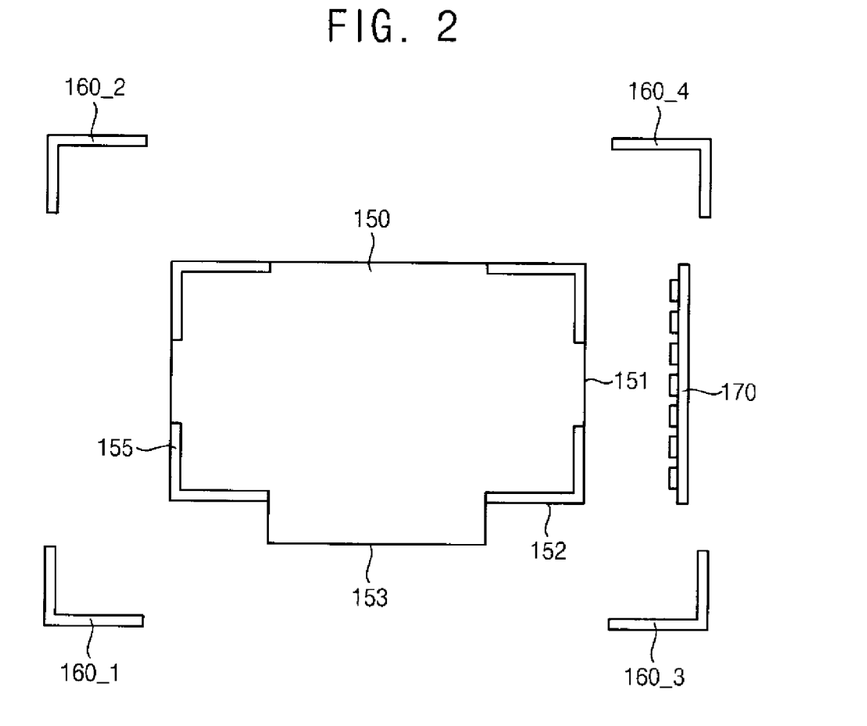
FIG. 2 is a plan view illustrating an assembly of a light guide plate, a light source module, and molding members of FIG. 1 according to an exemplary embodiment of the present invention.
Figure 3:
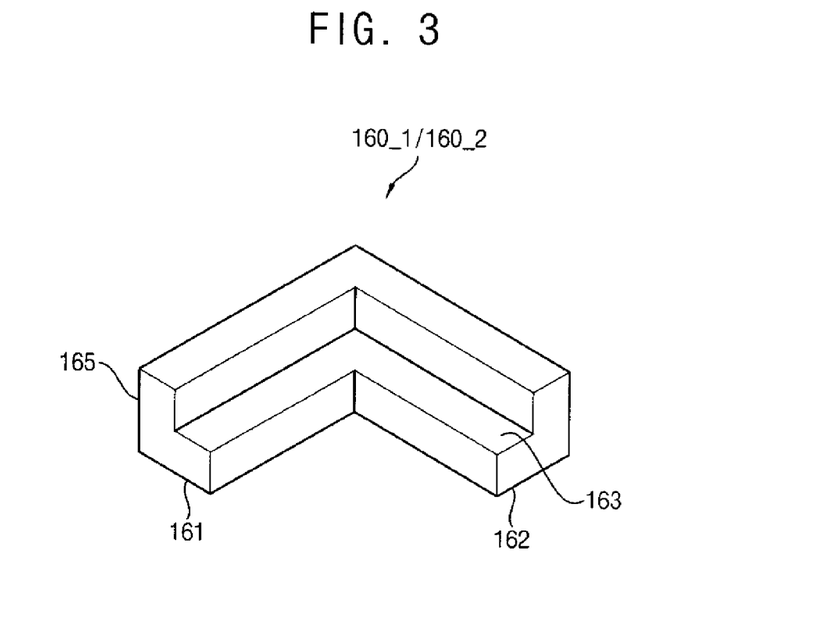
FIG. 3 is a perspective view illustrating a first molding member of FIG. 2 according to an exemplary embodiment of the present invention.
Figure 4:
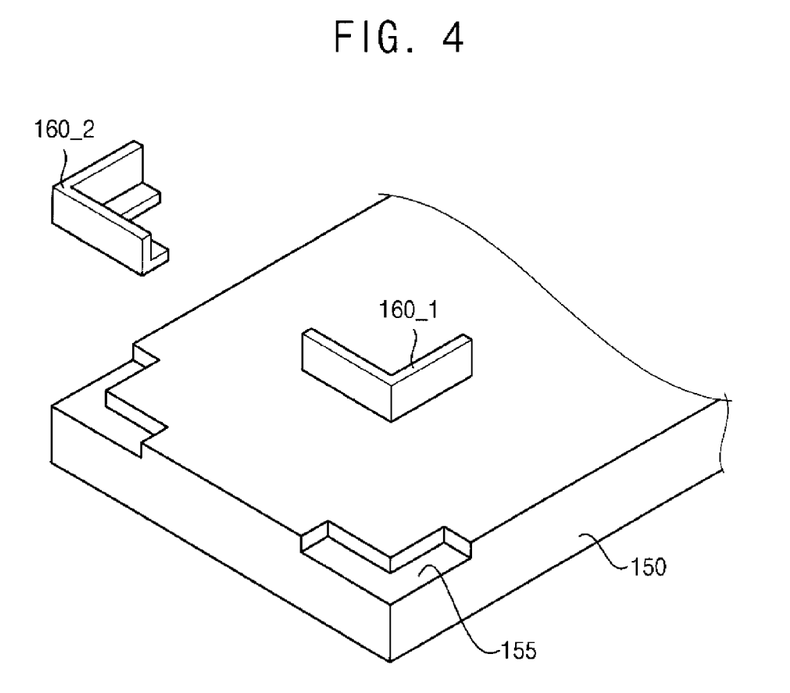
FIG. 4 is a perspective view illustrating an assembling process of the first molding member and the light guide plate of FIG. 3 according to an exemplary embodiment of the present invention.

FIG. 2 is a plan view illustrating an assembly of a light guide plate 150, a light source module 170, and the molding member 160 of FIG. 1. FIG. 3 is a perspective view illustrating a first molding member 160_1 of FIG. 2. FIG. 4 is a perspective view illustrating an assembling process of the first molding members 160_1, 160_2 and the light guide plate 150 of FIG. 3.

Referring to FIG. 2, the light source module 170 is disposed adjacent to the light incident surface 151 of the light guide plate 150. The display device 100 includes a plurality of the molding members 160. The molding members 160 are disposed on the corners of the light guide plate 150 so that the molding members 160 partially enclose the corners of the light guide plate 150. Each of the molding members 160 may be formed in an L-shape so that the molding members 160 guide corner areas of the light guide plate 150. The light guide plate 150 includes a stepped portion corresponding to the bottom surface of each of the molding members 160 so that the molding members 160 are fit in the stepped portion.

The molding members 160 include a first pair of molding members 160_1 and 160_2 disposed on two corners of one side of the light guide plate 150 and a second pair of molding members 160_3 and 160_4 disposed on two corners of the other side of the light guide plate 150 adjacent to the light source module 170. The first pair of molding members 160_1 and 160_2 and the second pair of molding members 160_3 and 160_4 may be symmetrically disposed with respect to a center line of the display. In another exemplary embodiment of the present invention, the light source module 170 may be disposed at a longer side of the light guide plate 150. When the light source module 170 is disposed at a longer side of the light guide plate 150, the second pair of molding members 160_3 and 160_4 may be disposed on two corners of the longer side of the light guide plate 150.

Referring to FIGS. 3 and 4, each of the first pair of molding members 160_1 and 160_2 may include a bottom portion 161 partially covering an upper surface of the light guide plate 150 and a sidewall portion 165 protruding from the bottom portion 161 in a vertical direction, and guiding a side surface of the display panel 110. Each of the bottom portions 161 of the first molding members 160_1 and 160_2 includes a bottom surface 162 contacting the upper surface of the light guide plate 150 and a supporting surface 163 on which a portion of the display panel 110 is supported. The bottom portion 161 is integrated with a stepped portion 155 of the light guide plate 150. One of the corners of the display panel 110 is disposed on the L-shaped structure which the bottom portion 161 and the sidewall portion 165 form together. The stepped portion 155 of the light guide plate 150 may have substantially the same shape as the bottom surface 162 of the first molding members 160_1 and 160_2. The stepped portion may have a desired depth so that the first molding members 160_1 and 160_2 fit in the stepped portions 155.

Accordingly, the light guide plate 150 has the supporting portion 153 on which the circuit board 120 is disposed and the molding member 160 thereby minimizing the extra space occupied by display's components and thereby lowering the manufacturing cost of the display device.

Figure 5:
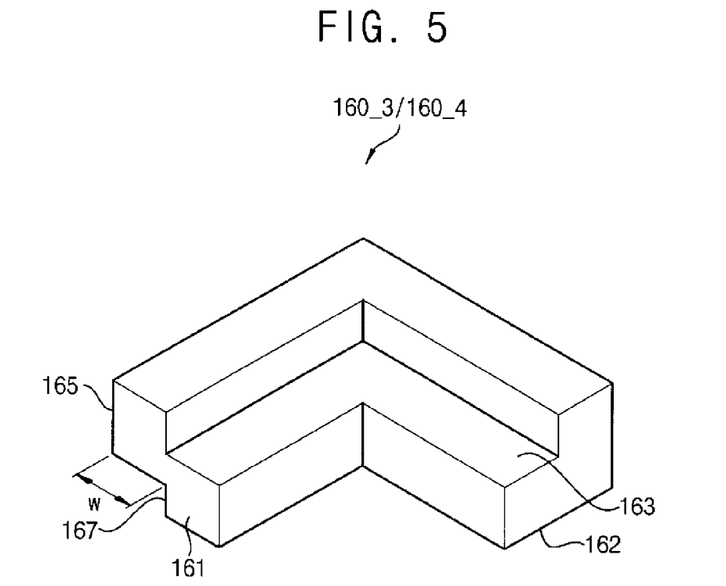
FIG. 5 is a perspective view illustrating a second molding member of FIG. 2 according to an exemplary embodiment of the invention.
Figure 6A:
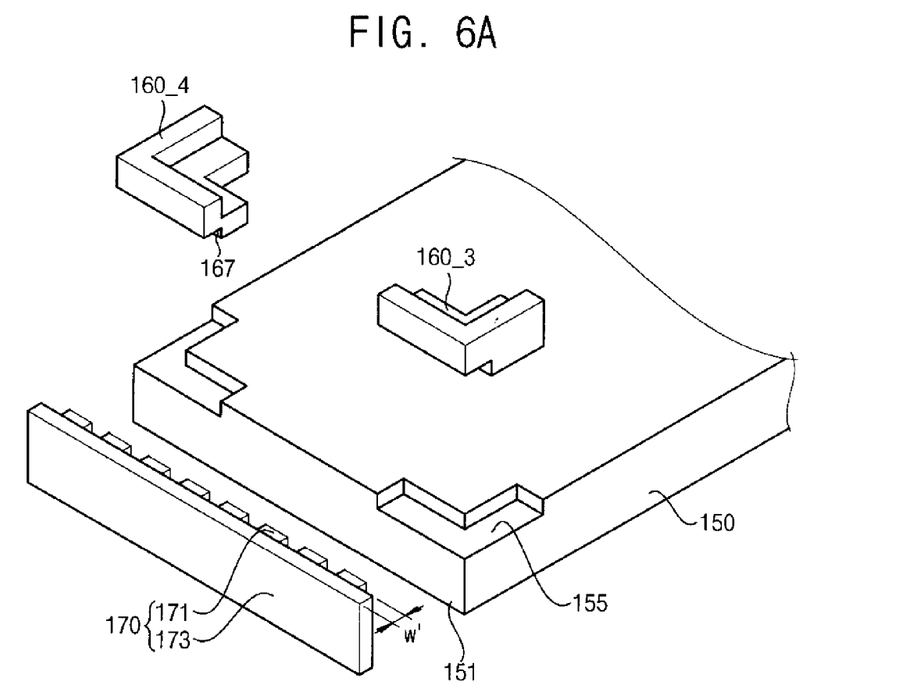
FIG. 6A and FIG. 6B are perspective views illustrating an assembling process of the second molding member and the light guide plate of FIG. 5 according to an exemplary embodiment of the present invention.
Figure 6B:
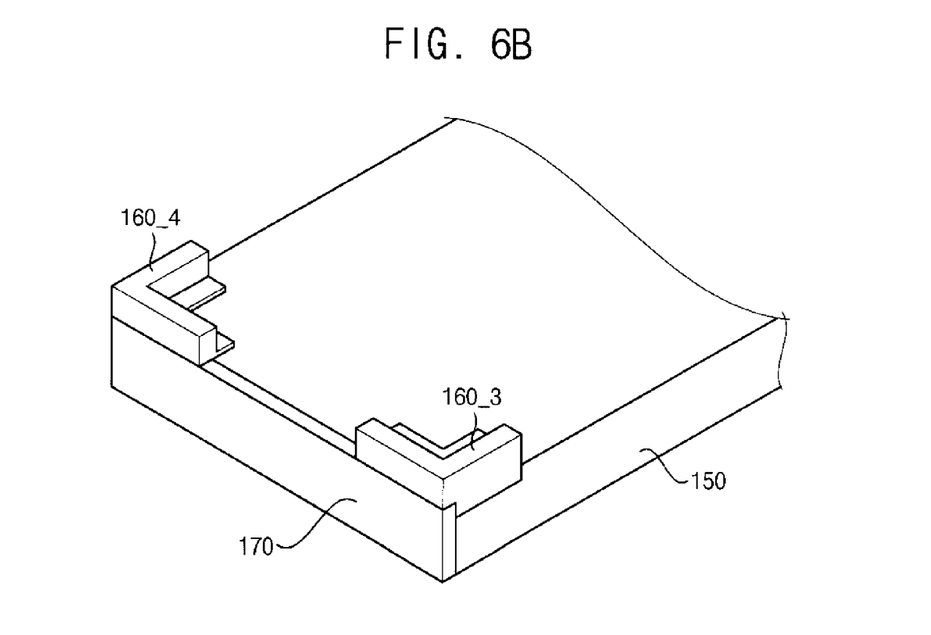

FIG. 5 is a perspective view illustrating second molding members 160_3, 160_4 of FIG. 2. FIGS. 6A and 6B are perspective views illustrating an assembling process of the second molding members 160_3, 160_4 of FIG. 5 and the light guide plate 150.

Referring to FIG. 5, the second molding members 160_3 and 160_4 are substantially the same as the first molding members 160_1 and 160_2 except that each of the second molding members 160_3 and 160_4 has a stepped portion 167 to partially guide the light source board 171 under a lower surface of the bottom portion 161. Due to the stepped portion 167, the first molding members 160_1 and 160_2 and the second molding members 160_3 and 160_4 are different in size or shape from each another. The second molding members 160_3 and 160_4 are disposed on two corners of the side of the light guide plate 150 which is adjacent to the light source module 170. The stepped portion 167 of each of the second molding members 160_3 and 160_4 is adequately molded inward to fit the light source board 173 of the light source module 170.

Referring to FIGS. 6A and 6B, the light source module 170 is integrated with the light guide plate 150 so that the light incident surface 151 of the light guide plate 150 is covered by the light source module 170. The bottom portions of the second molding members 160_3, 160_4 are integrated with the stepped portions 155 of the light guide plate 150. Due to the stepped portion 167 of each of the second molding members 160_3, 160_4, the sidewalls 165 of the second molding members 160_3, 160_4 and a rear surface of the light source board 171 may be parallel to each other without any stepped region. For that reason, a width w of the stepped portion 167 of each of the second molding members 160_3, 160_4 may be substantially the same as the width w' of the side surface of the light source board 171 plus the thickness of the protrusions 171.

Figure 7:
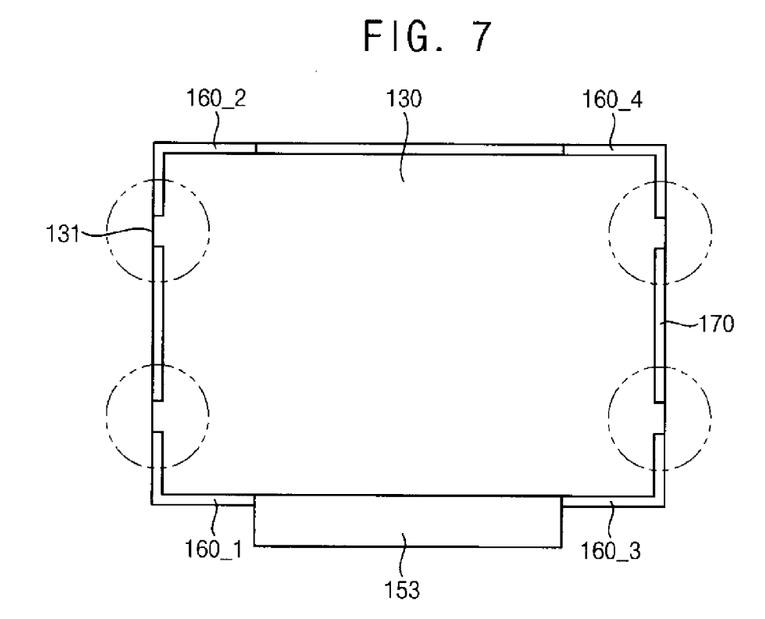
FIG. 7 is a plan view illustrating an integrated assembly of the light guide plate, the light source module, and the molding members of FIG. 2 according to an exemplary embodiment of the present invention.

FIG. 7 is a plan view illustrating an integrated assembly of the light guide plate 150, the light source module 170, the optical sheets 130, and the molding members 160 of FIG. 2.

Referring to FIG. 7, the light source module 170 is disposed on the light incident surface 151 of the light guide plate 150. The first molding members 160_1 and 160_2 and the second molding members 160_3 and 160_4 are disposed on each corner of the light guide plate 150. One or more of the optical sheets 130 are disposed on the light guide plate 150. Although not shown, the diffusion sheet 140 may be disposed between the light guide plate 150 and the optical sheets 130. The optical sheets 130 and the diffusion sheet 140 have protruding portions 131 which are guided on end portions of the molding members 160. The protruding portions 131 and side surfaces of the light guide plate 150 may be attached to each other by a taping material (not shown) to prevent the optical sheets 130 from moving from the upper surface of the light guide plate 150.

Figure 8A:
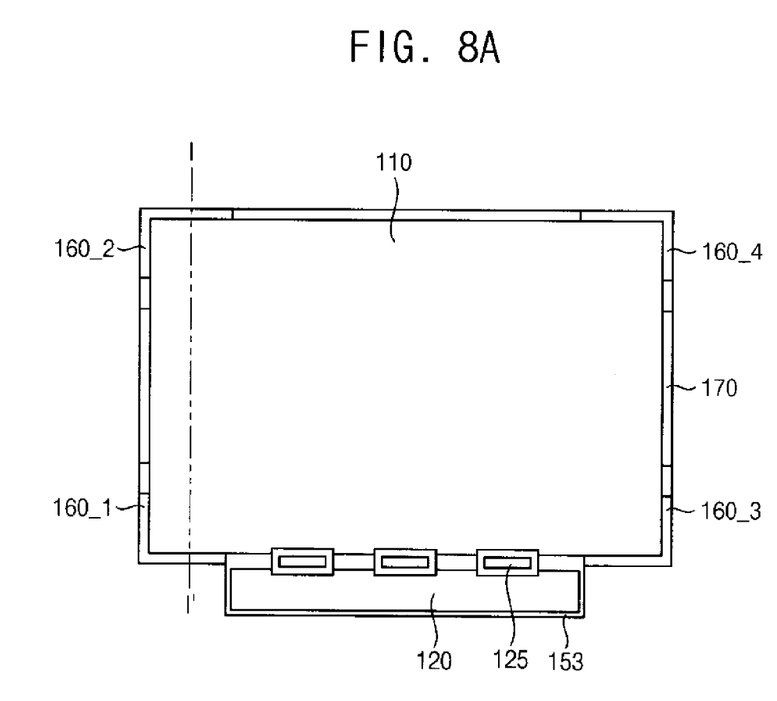
FIG. 8A is a plan view illustrating a display panel integrated with the assembly of FIG. 7.
Figure 8B:
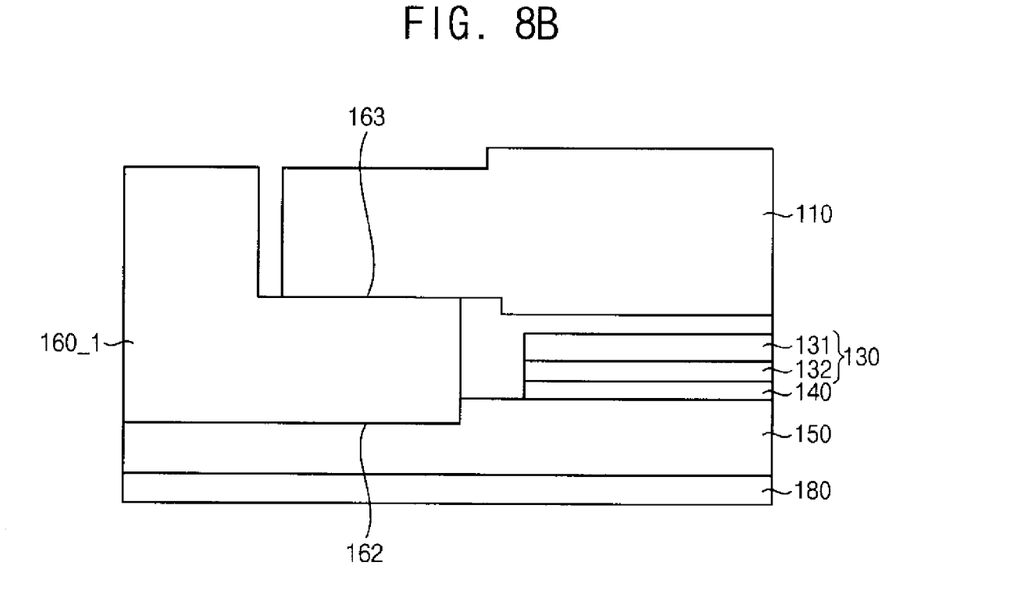
FIG. 8B is a cross-sectional view taken along a line of I-I' of FIG. 8A.

FIG. 8A is a plan view illustrating a display panel integrated with the assembly of FIG. 7. FIG. 8B is a cross-sectional view taken along a line of I-I' of FIG. 8A.

Referring to FIGS. 8A and 8B, the display panel 110 is disposed on the optical sheets 130. The molding members 160 guide corners of the display panel 110. The lower surfaces 162 of the molding members 160 contact with the light guide plate 150 and the supporting surfaces 163 of the molding members 160 contact with portions of lower surface of the display panel 110. The display panel 110 and the optical sheets 130 may be spaced apart from each other by the molding members 160. Moreover, as shown in FIG. 8B, the display panel may be spaced apart from a vertical interior surface of the molding member 160. However, the invention is not limited thereto. For example, the display panel and the vertical interior surface of the molding member may not be spaced apart. Also, the circuit board 120 is disposed on the supporting portion 153 of the light guide plate 150. The supporting portion 153 may have substantially the same shape and area as the shape and area of the circuit board 120.

Figure 9A:
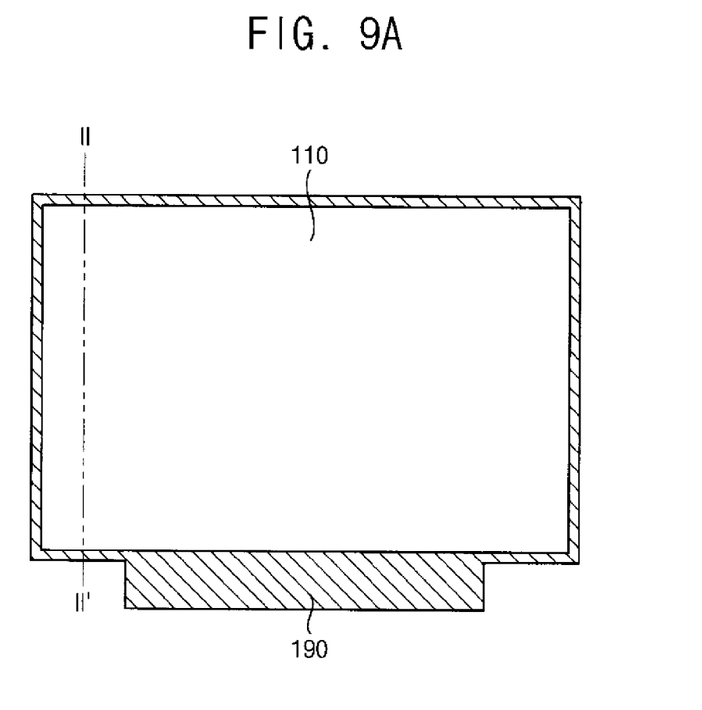
FIG. 9A is a plan view illustrating a covering member integrated with the assembly of FIG. 8A according to an exemplary embodiment of the present invention.
Figure 9B:
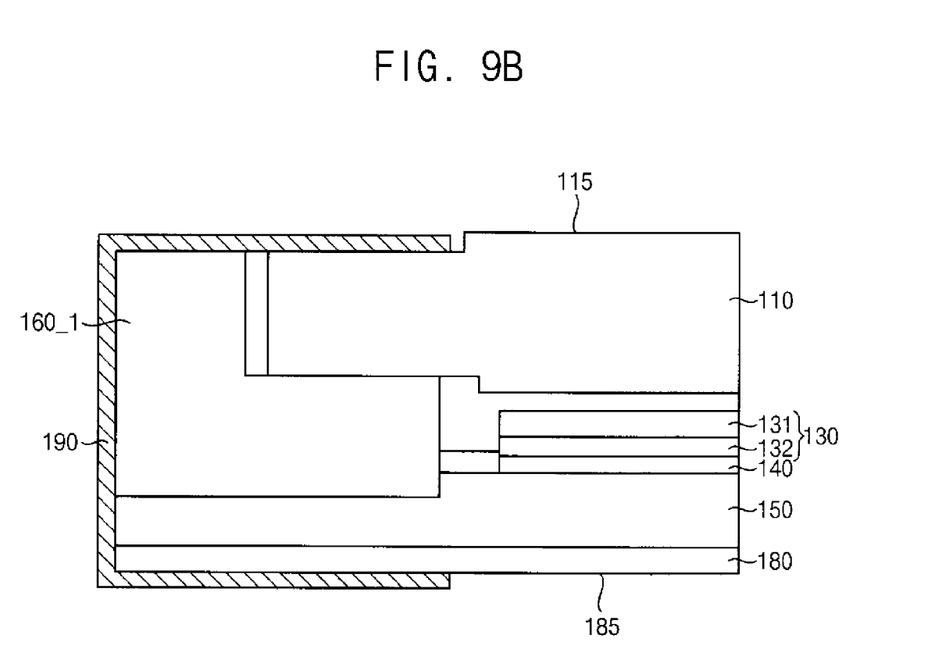
FIG. 9B is a cross-sectional view taken along a line of II-II' of FIG. 9A.

FIG. 9A is a plan view illustrating a covering member integrated with the assembly of FIG. 8A. FIG. 9B is a cross-sectional view taken along a line of II-II' of FIG. 9A.

Referring to FIGS. 9A and 9B, the covering member 190 covers sides of the reflection sheet 180, the light guide plate 150, the molding members 160, the diffusion sheet 140, the optical sheets 130, and the display panel 110. The covering member 190 partially covers the upper surface of the display panel 110 so that a display area of the display panel 110 is exposed. The covering member 190 may include a tape having an attaching surface on one side. The covering member may include aluminum material to prevent heat from outside.

According to the exemplary embodiments of the present invention the components of the display device 100 are fixed and held together by a covering member 190 instead of a bottom chassis. The covering member 190 is thinner and lighter than a bottom chassis. Thus, by using a covering member instead of a bottom chassis, the assembling process of the components of the display device may be simplified.

Figure 10:
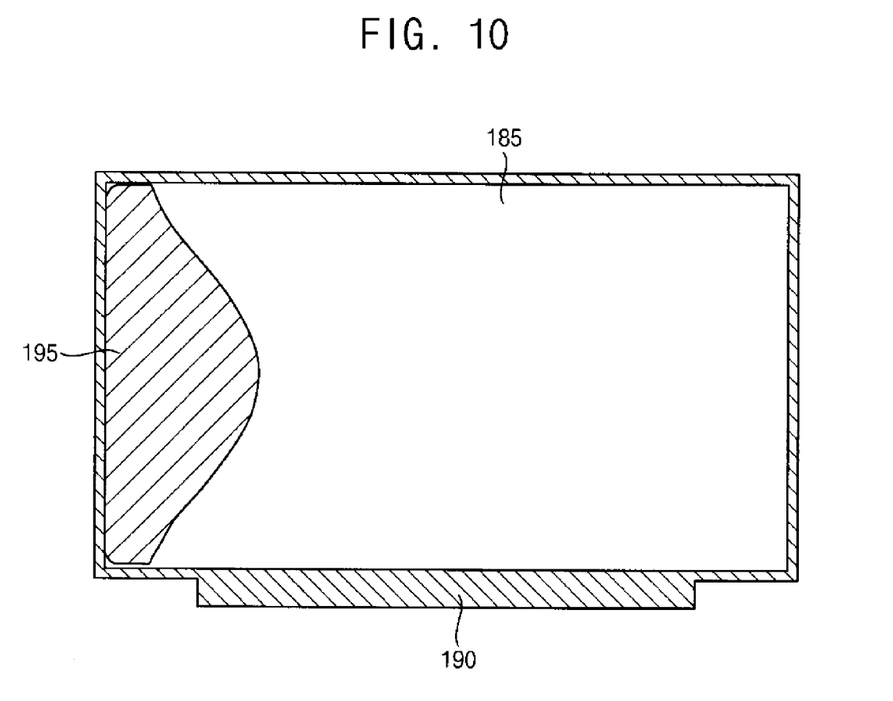
FIG. 10 is a plan view illustrating an aluminum sheet disposed on a rear surface of the display device of FIG. 9A according to an exemplary embodiment of the present invention.

FIG. 10 is a plan view illustrating an aluminum sheet disposed on a rear surface of the display device of FIG. 9A.

Referring to FIG. 10, the reflection sheet 180 is disposed under the light guide plate 150 and an additional aluminum sheet 195 may be disposed under a rear surface 185 of the reflection sheet 180 in an area adjacent to the light source module 170. When the covering member 190 includes aluminum material, the covering member 190 may extend to form the rear aluminum sheet, or an additional aluminum sheet 195 may be attached to the rear surface 185 of the reflection sheet 180.

Figure 11:
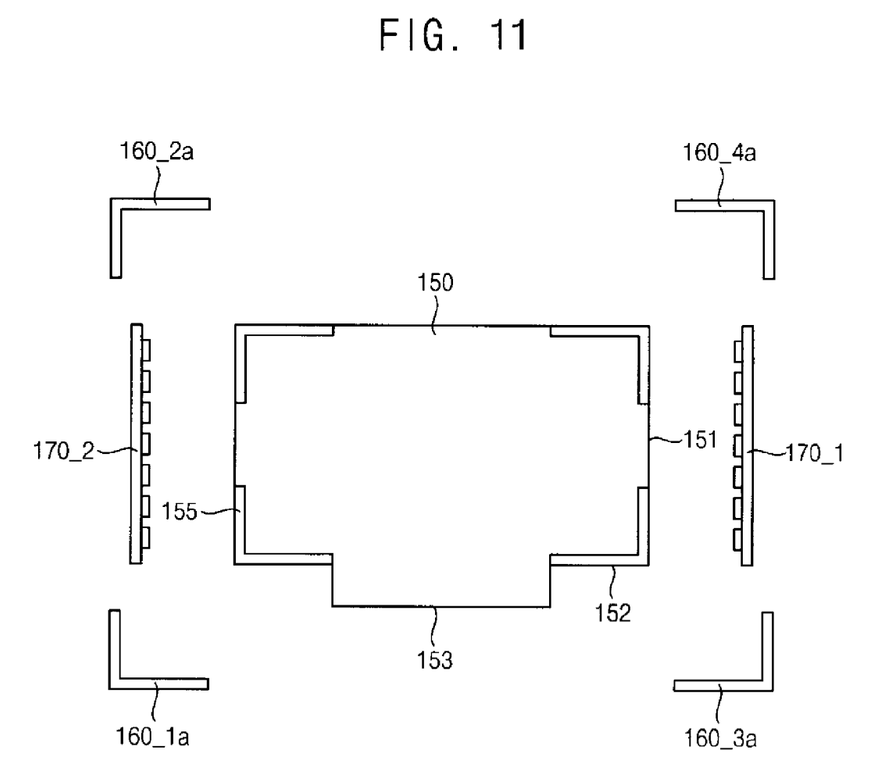
FIG. 11 is a plan view illustrating an assembly of a light guide plate, a plurality of light source modules, and a third molding members according to another exemplary embodiment of the present invention.

FIG. 11 is a plan view illustrating an assembly of a light guide plate 150, a plurality of light source modules 170_1, 170_2, and third molding members 160 according to another exemplary embodiment of the present invention. Hereinafter, further repetitive explanation concerning the above elements will be omitted.

Referring to FIG. 11, in an exemplary embodiment of the present invention a plurality of light source modules 170_1 and 170_2 are disposed on two opposite sides of the light guide plate 150. In the present exemplary embodiment, a third molding members 160_1a, 160_2a, 160_3a and 160_4a may be disposed on four corners of the light guide plate 150. The third molding members 160_1a, 160_2a, 160_3a and 160_4a may have substantially the same shape as the second molding members 160_3 and 160_4.

Figure 12:
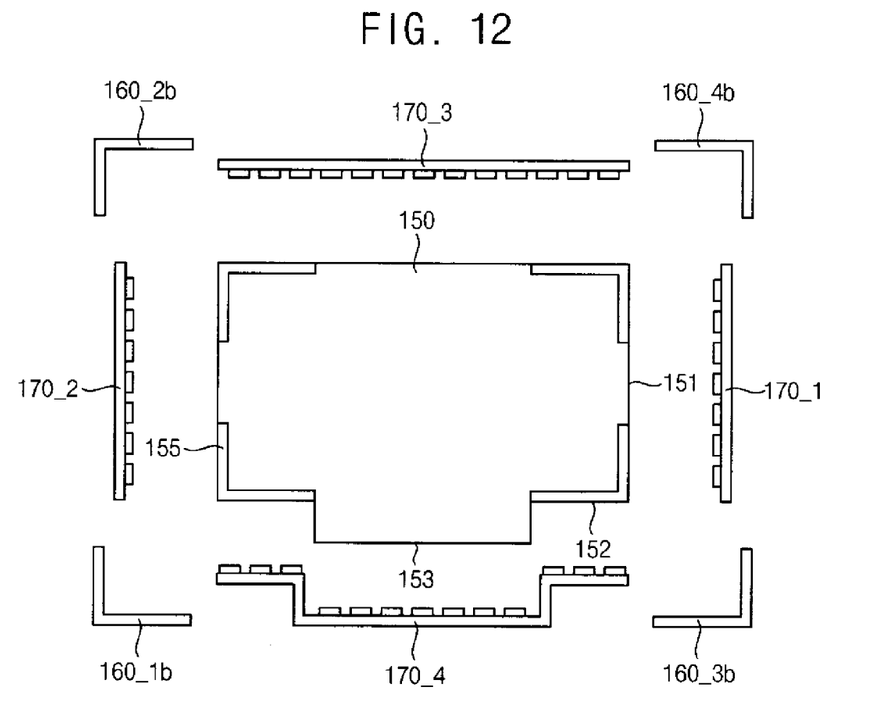
FIG. 12 is a plan view illustrating an assembly of a light guide plate, a plurality of light source modules, and a fourth molding members according to still another exemplary embodiment of the present invention.
Figure 13:
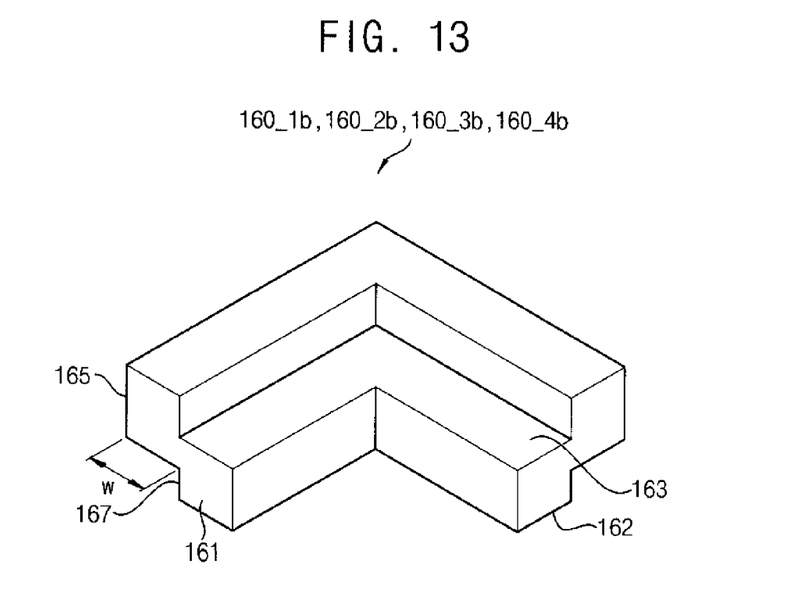
FIG. 13 is a perspective view illustrating one of the fourth molding members of FIG. 12 according to an exemplary embodiment of the present invention.
Figure 14A:
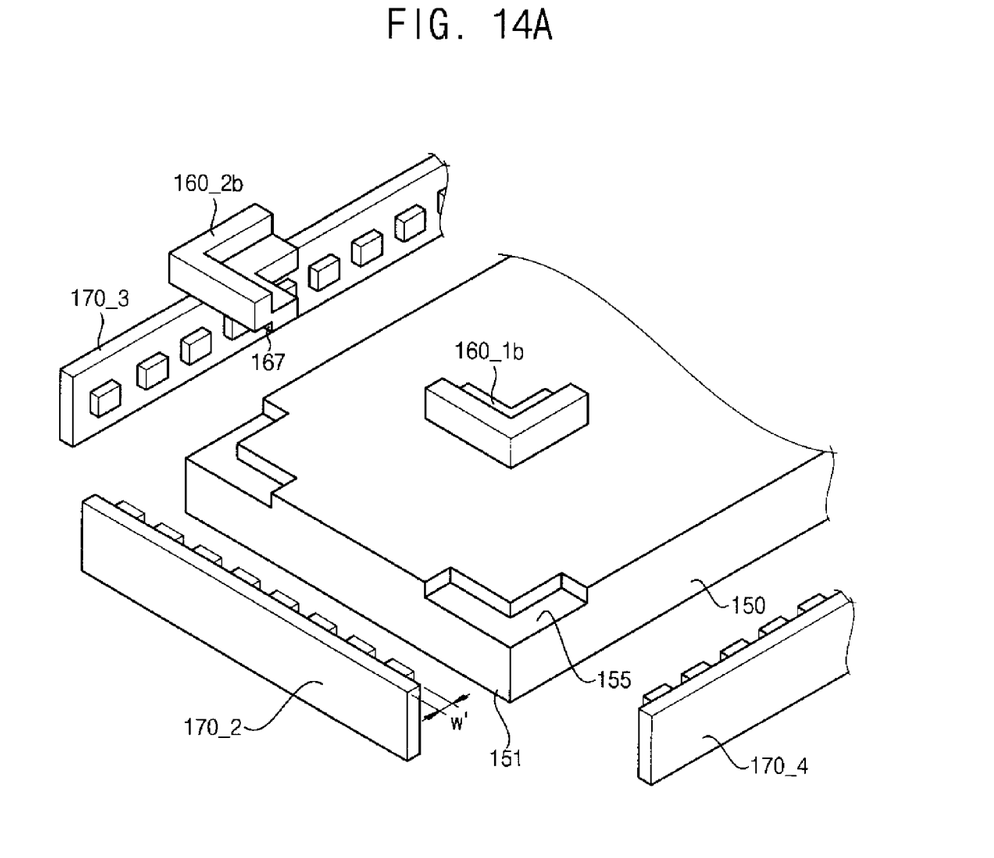
FIG. 14A and FIG. 14B are perspective views illustrating an assembling process of the fourth molding members and the light guide plate of FIG. 13 according to an exemplary embodiment of the present invention.
Figure 14B:
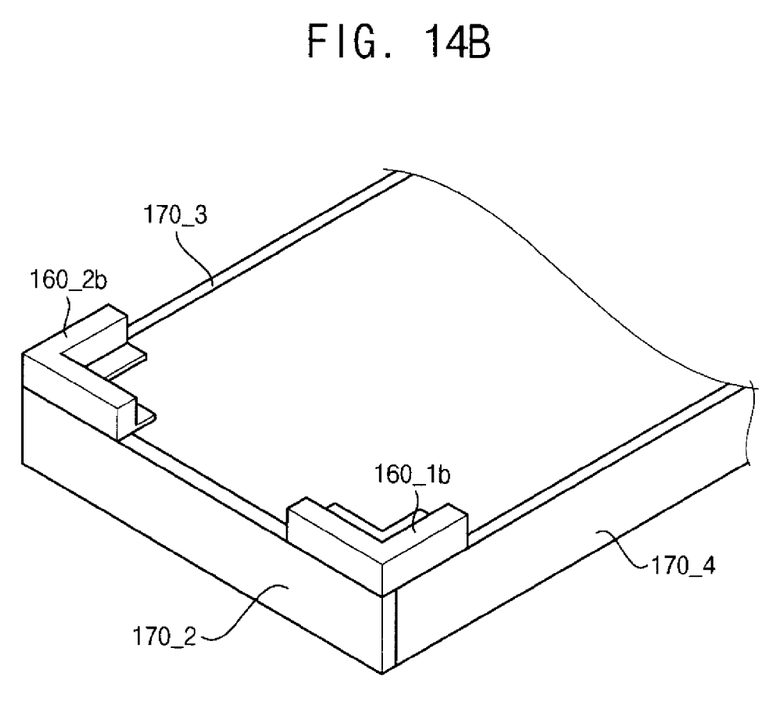

FIG. 12 is a plan view illustrating an assembly of a light guide plate, a plurality of light source modules, and a plurality of fourth molding members according to still another exemplary embodiment of the present invention. FIG. 13 is a perspective view illustrating one of the fourth molding members of FIG. 12. FIGS. 14A and 14B are perspective views illustrating an assembling process of the fourth molding members and the light guide plate of FIG. 13.

Referring to FIG. 12, a plurality of light source modules 170_1, 170_2, 170_3 and 170_4 are disposed on all sides of the light guide plate 150. That is, the plurality of the light source modules 170_1, 170_2, 170_3 and 170_4 are disposed to enclose all side surfaces of the light guide plate 150. In the present exemplary embodiment, a fourth molding members 160_1b, 160_2b, 160_3b and 160_4b may be disposed on four corners of the light guide plate 150.

Referring to FIG. 13, the fourth molding members 160_1b, 160_2b, 160_3b and 160_4b are substantially the same as the second molding members 160_3 and 160_4 except that the bottom portion 161 of each of the fourth molding members 160_1b, 160_2b, 160_3b and 160_4b has stepped portions 167 along two sides of the molding members so that the plurality of the light source modules 170_1, 170_2, 170_3 and 170_4 are guided under the stepped portions 167.

Referring to FIGS. 14A and 14B, the plurality of the light source modules 170_1, 170_2, 170_3, and 170_4 are integrated with each sides of the light guide plate 150. The bottom portion 161 of each of the fourth molding members 160_1b, 160_2b, 160_3b and 160_4b are disposed on the stepped portion 155 of the light guide plate 150. Due to the stepped portion 167 of each of the fourth molding members 160_1b, 160_2b, 160_3b and 160_4b, the sidewalls 165 of the fourth molding members 160_1b, 160_2b, 160_3b, and 160_4b and a rear surface of the light source board 173 may be parallel to one another without any stepped region.

Exemplary embodiments of the present invention disclose a display device that does not need to employ a bottom chassis to hold the display's components. Exemplary embodiments of the present invention may use a covering member to hold the components of the display. The covering member is thinner and lighter than a bottom chassis thereby the assembling process of the components may be simplified.

Moreover, exemplary embodiments of the present invention also disclose a display device that may employ molding members and supporting portions integrated with a light guide plate on which the circuit board is disposed, thereby resulting in minimization of the extra space occupied by components and a reduced manufacturing cost of the display device.

Further, exemplary embodiments of the present invention provide a display device for which a deterioration of the display quality due to the transformation or bending of a bottom chassis, which may cause display stains, is avoided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A display device comprising:
a display panel displaying an image;
a circuit board comprising a driving circuit mounted thereon and disposed adjacent to an edge of the display panel;
a light guide plate disposed under the display panel and configured to guide a light toward the display panel, wherein the light guide plate comprises a supporting portion that protrudes from a side surface of the light guide plate to support the circuit board;
at least one molding member disposed between the display panel and the light guide plate, and supporting the display panel; and
a covering member extending from a lower surface of the light guide plate to an upper surface of the display panel;
wherein the covering member is configured to hold and fix together the display panel, the circuit board, the light guide plate and the molding member.

2. The display device of claim 1, wherein the molding member comprises:
a bottom portion partially covering an upper surface of the light guide plate; and
a sidewall portion protruding from the bottom portion in a vertical direction, and guiding
a side surface of the display panel.

3. The display device of claim 2, wherein the bottom portion of the molding member comprises:
a bottom surface contacting the upper surface of the light guide plate; and
a supporting surface on which a portion of the display panel is supported.

4. The display device of claim 3, wherein the light guide plate comprises a stepped portion corresponding to the bottom surface of the molding member such that the molding member is fittable in the stepped portion.

5. The display device of claim 1, further comprising: a plurality of the molding members, wherein the molding members are disposed on corners of the light guide plate so that the molding members partially enclose the corners of the light guide plate.

6. The display device of claim 5, wherein the molding members are formed in an L-shape so that the molding members guide corner areas of the light guide plate.

7. The display device of claim 6, further comprising a light source module disposed adjacent to at least one side of the light guide plate, the light source module comprising a light source board on which a plurality of light sources generating light are mounted.

8. The display device of claim 7, wherein the plurality of molding members comprise:
first molding members disposed on two corners of a first side of the light guide plate; and
second molding members disposed on two corners of a second side of the light guide plate,
wherein the second side is opposite to the first side,
wherein the molding members comprise stepped portions to partially guide the light source board, and
wherein the two corners of the second side of the light guide plate are adjacent to the light source module.

9. The display device of claim 8, wherein the first molding members and the second molding members are disposed symmetrically with respect to a center of the display device.

10. The display device of claim 8, wherein the widths of the stepped portions of the second molding members are substantially the same as the width of a side surface of the light source board.

11. The display device of claim 7, further comprising: a plurality of the light source modules disposed adjacent to side surfaces of the light guide plate.

12. The display device of claim 1, further comprising an aluminum sheet disposed in an area adjacent to the light source module under the light guide plate.

13. The display device of claim 1, wherein the covering member covers the entire side surfaces of the light guide plate.

14. The display device of claim 13, wherein the covering member partially covers an upper surface of the display panel and exposes a display area of the display panel.

15. The display device of claim 1, wherein the supporting member comprises a supporting surface whose area is substantially the same as, or larger, than an area of the circuit board.

16. The display device of claim 1, further comprising at least one optical sheet and a diffusion sheet disposed on the light guide plate.

17. The display device of claim 16, wherein the optical sheet and the diffusion sheet comprise protruding portions guided to an end portion of the molding member.

18. The display device of claim 16, wherein the display panel and the optical sheet are spaced apart by the molding member.

19. The display device of claim 1, further comprising a reflection sheet disposed under the light guide plate, the reflection sheet being configured to reflect a portion of the light toward the light guide plate.

20. The display device of claim 11, wherein the light source modules enclose the edges of the light guide plate.

* * * * *